United States Patent [19]
Sun et al.

[11] Patent Number: 5,477,425
[45] Date of Patent: Dec. 19, 1995

[54] BICYCLE LAMP DEVICE

[76] Inventors: Min-Hsiung Sun, No. 761, Sec. 2, Ta-Tung Rd.; Wang-Hsing Lin, No. 24, Alley 14, Lane 291, Yen-Cheng Rd., both of Tainan, Taiwan

[21] Appl. No.: 346,167

[22] Filed: Nov. 21, 1994

[51] Int. Cl.$^6$ ........................................................ B62J 6/00
[52] U.S. Cl. .................................................. 362/72; 362/191
[58] Field of Search .............................. 362/72, 191, 190

[56] References Cited

U.S. PATENT DOCUMENTS 2,710,334  6/1955  Peterson ................................. 362/191

Primary Examiner—Carroll B. Dority
Attorney, Agent, or Firm—Varndell Legal Group

[57] ABSTRACT

A bicycle lamp device including a lamp body. A lamp mount for fastening to the bicycle frame. A connecting member for fastening the lamp body to the lamp mount, and a circuit board installed in the lamp body and controlled by a charge coupled device to give light when the intensity of outside light drops below a predetermined value. The lamp body being turned about a coupling disc at one end of the connecting member and then fixed in position by a projecting block on the coupling disc. The lamp mount consisting of a mounting frame fixed to the bicycle frame and coupling frame turned about a screw bolt on the mounting frame and fixed in position by a nut to hold the lamp body.

3 Claims, 7 Drawing Sheets

5,477,425

1

BICYCLE LAMP DEVICE

BACKGROUND OF THE INVENTION

The present invention relates to a bicycle lamp device which can be conveniently fastened to the front or rear side of a bicycle and adjusted to the desired angular position and, which can also be used as a flash light.

A bicycle is generally equipped with a bicycle lamp for riding at night. This bicycle lamp is controlled by an On/Off switch. Therefore, the bicycle lamp must be control led manually. If the bicycle rider forgot to switch off the bicycle lamp after an use of the bicycle, the bicycle lamp will continuously consume power supply. Another drawback of this type of bicycle lamp is its limited projecting angle because it cannot be conveniently adjusted in all directions after its installation. Furthermore, when the bicycle lamp is installed, it cannot be easily detached from the bicycle for use separately.

SUMMARY OF THE INVENTION

The present invention has been accomplished under the circumstances in view. It is therefore an object of the present invention to provide a bicycle lamp device which can be conveniently fastened to the bicycle frame at the desired location. It is another object of the present invention to provide a bicycle lamp device which can be conveniently adjusted to change the projecting angle of the lamp horizontally as well as vertically. It is still another object of the present invention to provide a bicycle lamp device which can be conveniently detached from the bicycle and used as a flash light for personal use. According to the present invention, the bicycle amp device comprises a lamp body, a lamp mount for fastening to the bicycle frame, a connecting member for fastening the lamp body to the lamp mount, and a circuit board installed in the lamp body and controlled by a charge coupled device to give light when the intensity of outside light drops below a predetermined value. The lamp body can be turned about a coupling disc at one end of the connecting member and then fixed in position by a projecting block on the coupling disc. The lamp mount consists of a mounting frame fixed to the bicycle frame and coupling frame turned about a screw bolt on the mounting frame and fixed in position by a nut to hold the lamp body in position.

2

Figure 1:
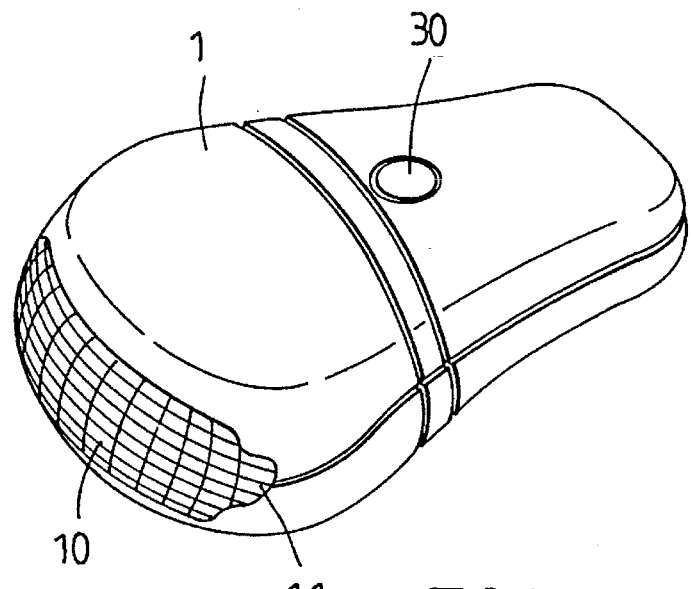
FIG. 1 is an elevational view of a lamp body for a bicycle lamp device according to the present invention.
Figure 2:
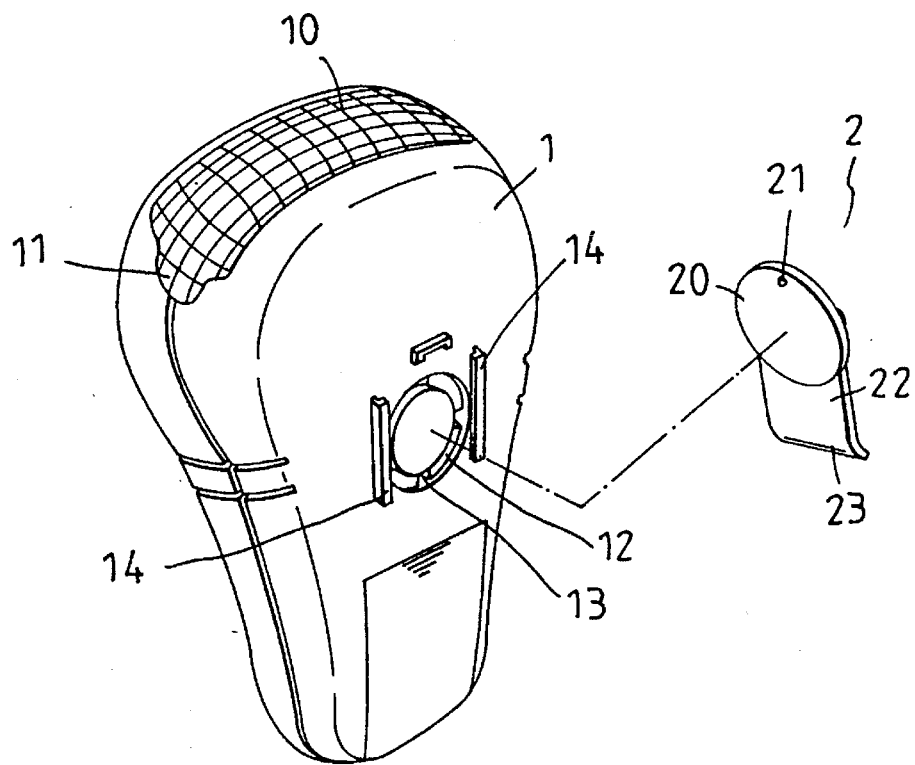
FIG. 2 shows the bottom side of the lamp body and the position of the connecting member relative to the lamp body according to the present invention.
Figure 3:
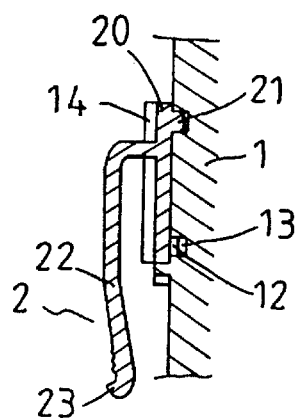
FIG. 3 is a sectional view showing the connection between the connecting member and the lamp body according to the present invention.
Figure 4:
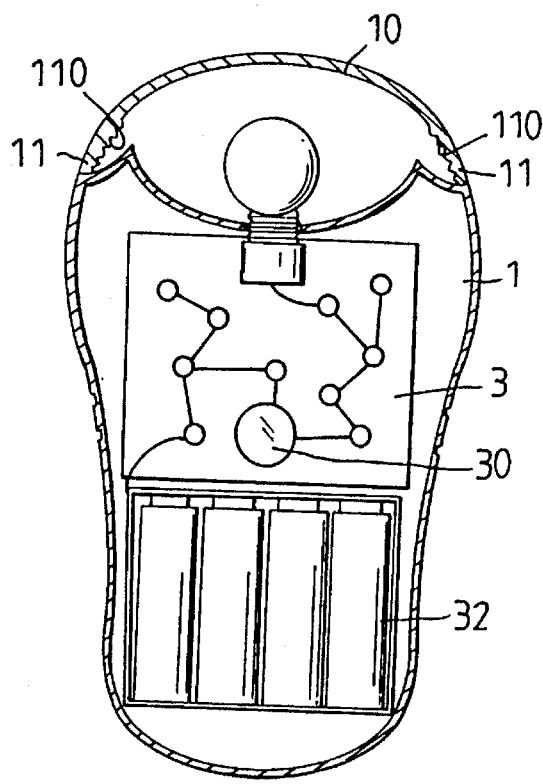
FIG. 4 is a plain view of the lamp body and the circuit board inside the lamp body according to the present invention.
Figure 5:
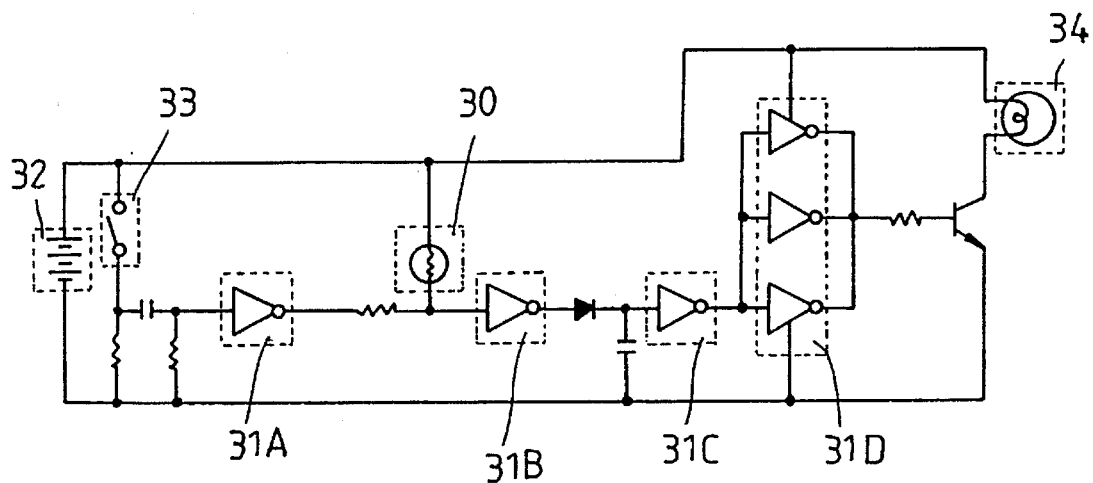
FIG. 5 is a circuit diagram of the circuit board according to the present invention.
Figure 6:
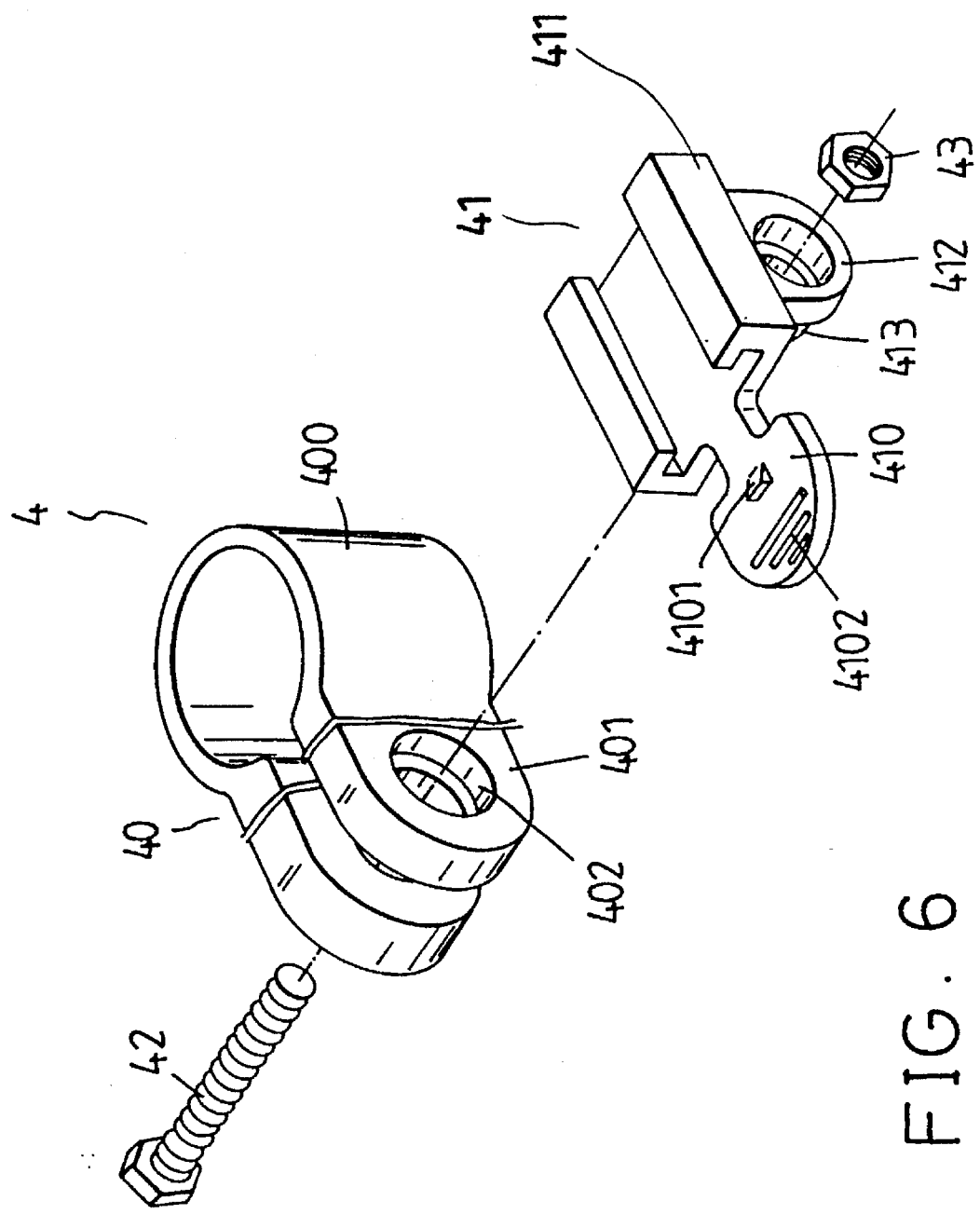
FIG. 6 is an exploded view of a lamp mount according to the present invention.
Figure 7:
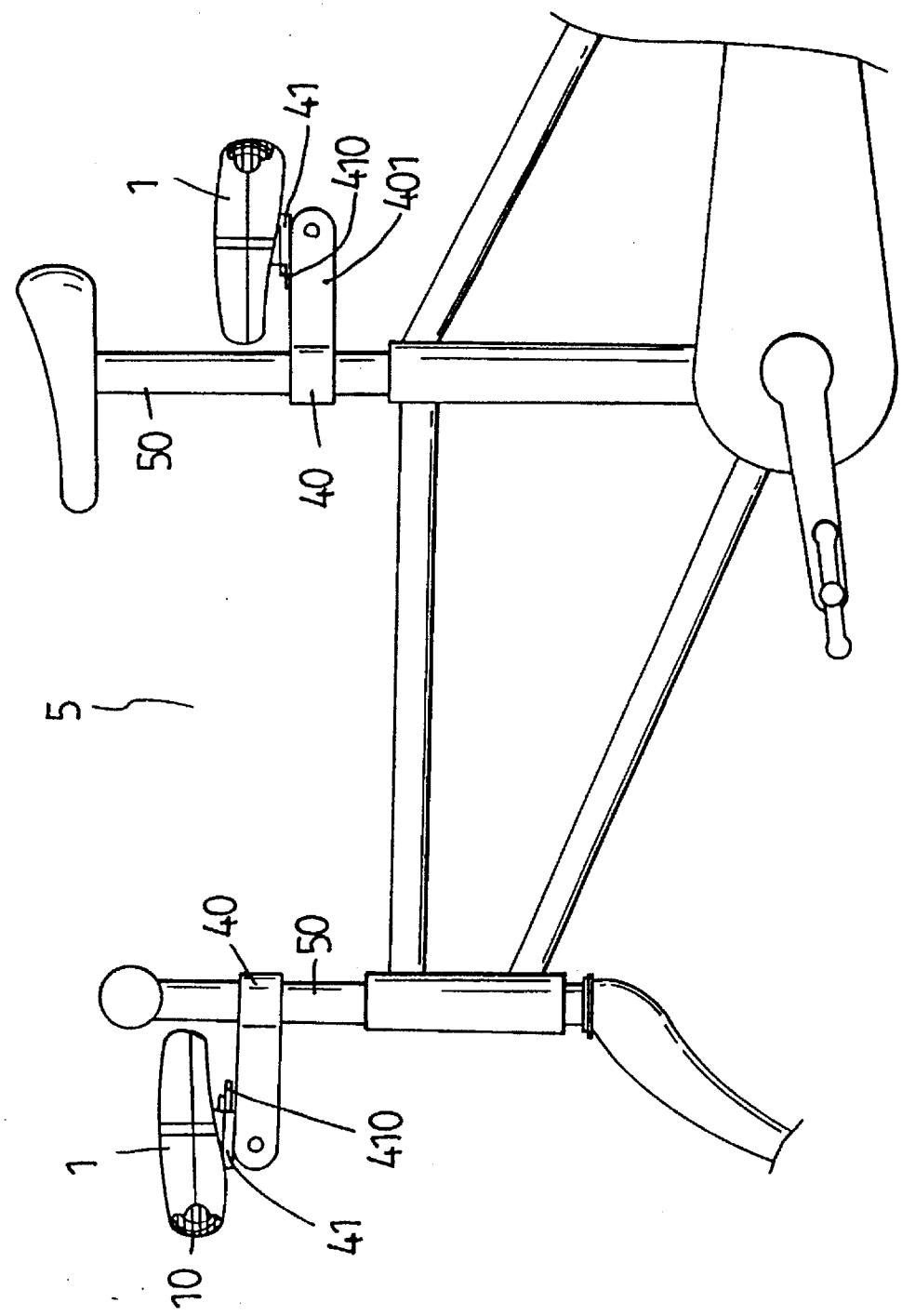
FIG. 7 is an installed view showing two bicycle lamp devices of the present invention installed in a bicycle.
Figure 9:
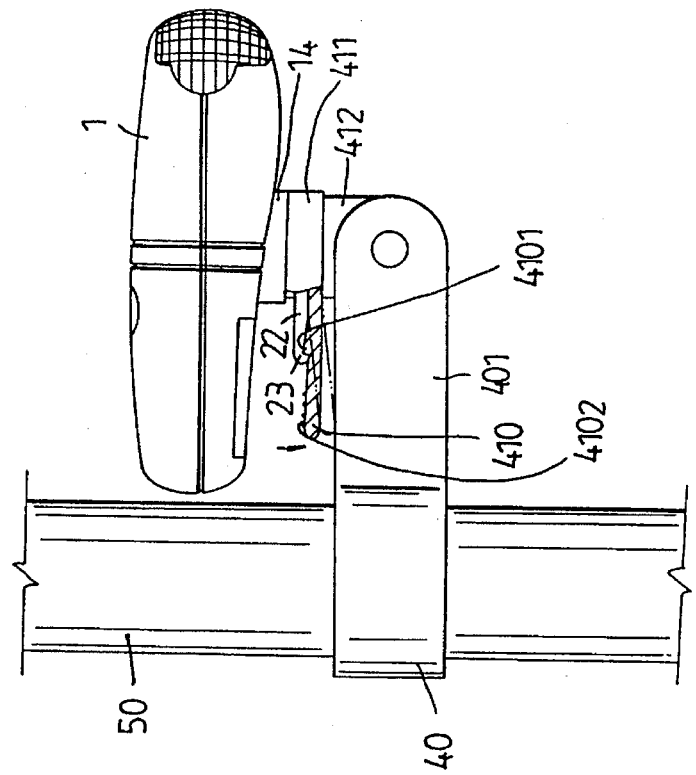
Figure 8:
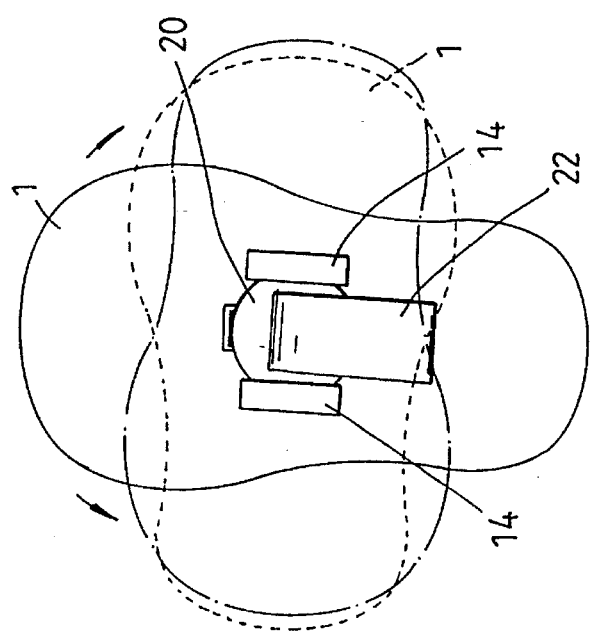
Figure 11:
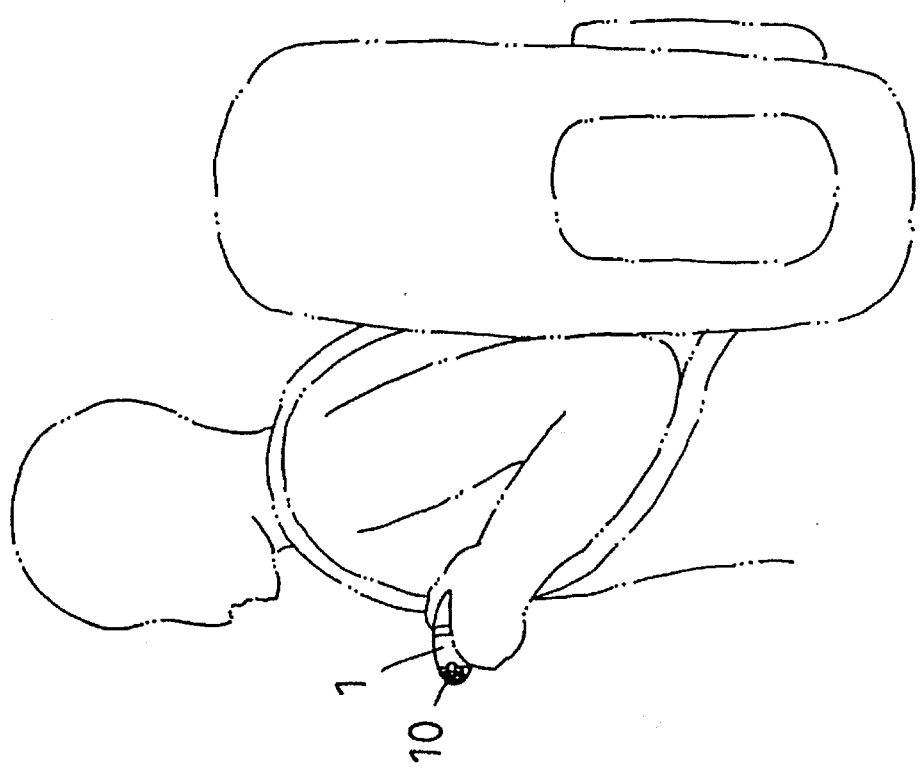
Figure 10:
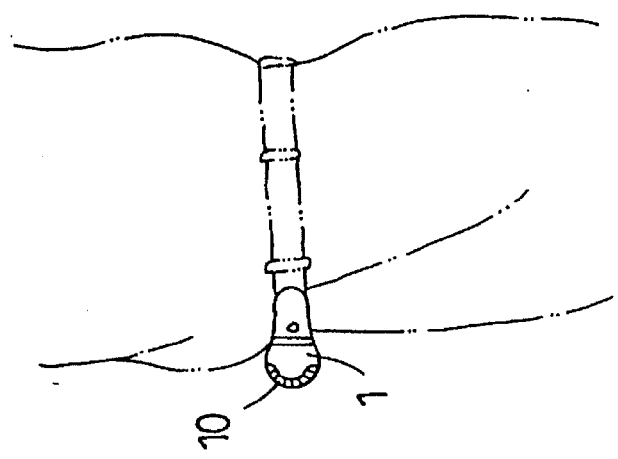
Figure 13:
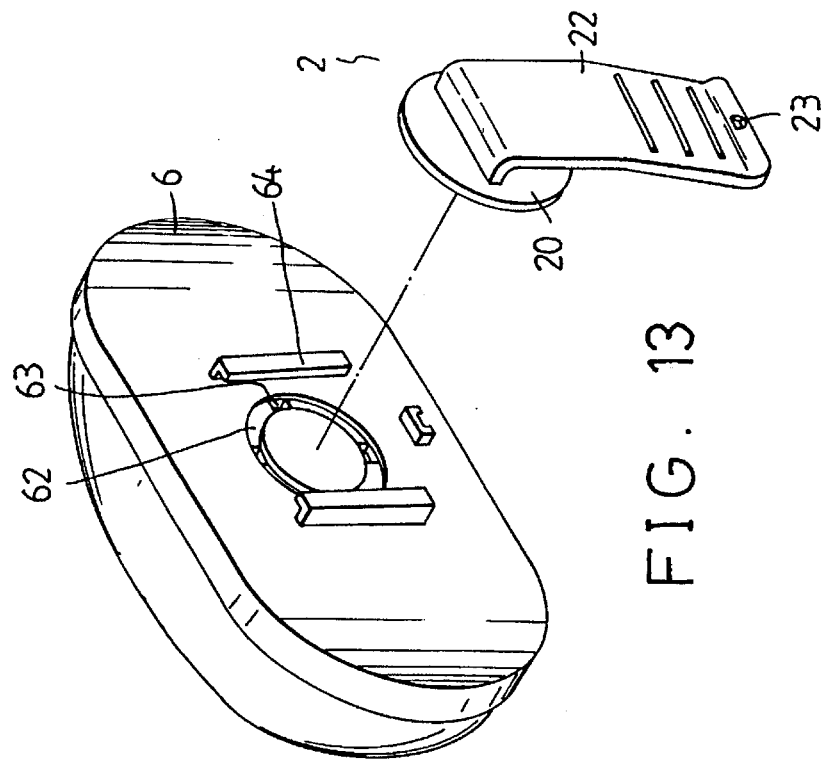
Figure 12:
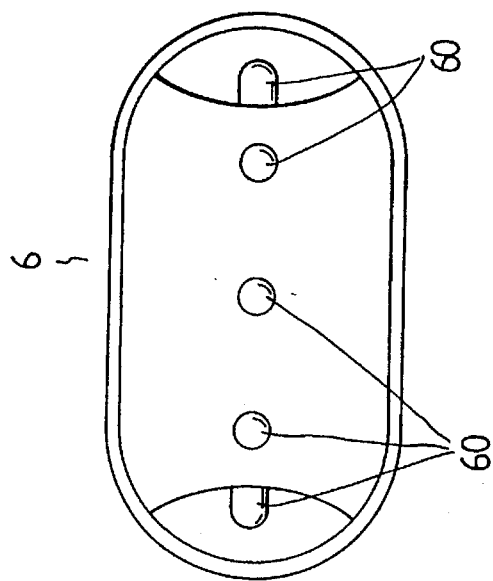

FIG. 8 shows the lamp body turned around the coupling disc of the connecting member according to the present invention;

FIG. 9 is a partial view in an enlarged scale of FIG. 7, showing the anti-skid stripes depressed to connect the hook on the coupling frame of the lamp mount from the hook on the connecting member;

FIG. 10 is an applied view of the present invention, showing the lamp body fastened to the user's belt;

FIG. 11 is another applied view of the present invention, showing the lamp body held hand and used as a flash light;

FIG. 12 is a plain view of an alternate form of the lamp body according to the present invention;

FIG. 13 shows the back side of the lamp body of FIG. 12; and

Figure 14:
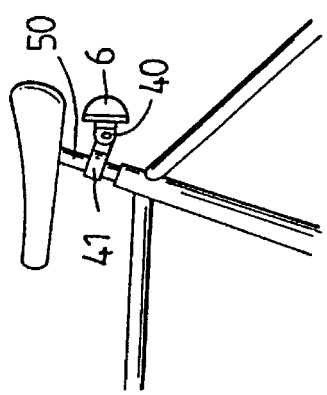

FIG. 14 is an installed view, showing the lamp body of FIG. 12 installed in a bicycle.

DETAILED DESCRIPTION OF THE PREFERRED EMBODIMENT

Referring to FIGS. 1 through 6, a bicycle lamp in accordance with the present invention is generally comprised of a lamp body 1, a connecting member 2, a circuit board 3, and a lamp mount 4. The lamp body 1 comprises an arched lampshade 10 at one end having two opposite extension portions 11, two toothed rails 110 bilaterally disposed inside the lampshade 10, two parallel rails 14 raised from the bottom side, an annular groove 12 disposed between the rails 14, and four retaining slots 13 equiangularly spaced through the annular groove 12.

The connecting member 2 comprises a coupling disc 20 at one end inserted in between the rails 14, and an elongated coupling plate 22 at an opposite end connected to the lamp mount 4. The coupling disc 20 has a projecting block 21 turned in the annular groove 12. The coupling plate 22 has a hook 23 at an outer side.

The circuit board 3 is installed inside the lamp body 1, comprising a charge coupled device 30, plurality of reversers 31a, 31b, 31c, and 31d, a battery 32, a spring switch 33, and a lamp bulb 34. The charge coupled device 30 is disposed out of the lamp body 1 to detect the intensity of outside light. When the intensity of outside light surpasses a predetermined value, the impedance of the charge coupled device 30 increases, and voltage is stopped from passing through, and therefore the lamp bulb 34 does no work. When the intensity of outside light drops below the predetermined value, the impedance of the charge coupled device 30 reduces, and electric current is allowed to pass through the spring switch 33. When the bicycle 5 is running, the vibration of the bicycle 5 causes the spring switch 33 electrically connected, and therefore the lamp bulb 34 is turned on to give light (see FIG. 5).

The lamp mount 4 is comprised of a mounting frame 40 and a coupling frame 41. The mounting frame 40 comprises a circular frame body 400 having two opposite ends terminating in two parallel lugs 401. The lugs 401 have a respective through hole 402 aligned with each other. The coupling frame 41 comprises a flat plate 410 at one end having a hook 4101 and anti-skid stripes 4102 at the top, a dovetail groove 411 at an opposite end, a downward mounting ring 412 disposed at the bottom and retained between the lugs 401 of the mounting frame 40 and having a tapered flange 413 around the border and fitted into the through hole 402 of one lug 401 of the mounting frame 40. A screw bolt 42 is inserted through the through holes 402 of the lug 401 of the mounting frame 40 and the downward mounting ring 412, and then screwed up with a nut 43 to fix the mounting frame 40 and the coupling frame 41 together.

Referring to FIGS. 7 and 8, when the circular frame body 400 of the mounting frame 40 is mounted around the frame tube 50 of the bicycle 5, the coupling frame 41 is fastened to the mounting frame 40 by fastening the mounting ring 412 of the coupling frame 41 to the lugs 401 of the mounting frame 40 by the screw bolt 42 and the nut 43, then the lamp body 1 is fastened to the coupling frame 41 of the lamp mount 4 by: inserting the coupling plate 22 of the connecting member 2 into the dovetail groove 411 of the coupling frame 41 and then hooking up the hook 23 of the coupling plate with the hook 4101 on the flat plate 410 of the coupling frame 41, When installed, the lamp body 1 can be turned about the coupling disc 20 to adjust its projecting angle (see FIG. 8), and then retained at the adjusted angle by fitting the projecting block 21 into one retaining slot 13. Each time the spring switch 33 is vibrated to make an electric contact, the lamp bulb 34 is turned on to give light for one minute. When the bicycle 5 is not moving, the spring switch 33 is off, and therefore the lamp bulb 34 does no work. The installation of the toothed rails 100 inside the lampshade 10 improve the refracting power of the lampshade 10. As shown in FIG. 7, the bicycle lamp of the present invention can be installed in the bicycle 5 at the front to produce light for illumination, or at the back to give a visual warning signal.

Referring to FIG. 9, the hooks 23 and 4101 can be disconnected from each other by pressing the anti-skid stripes 4102 downwards, so that the lamp body 1 can be removed from the lamp mount 4 for making a replacement of the battery 32.

Referring to FIGS. 10 and 11, the lamp body 1 can be separately used and held in hand as a flash light (see FIG. 11), or fastened to the belt by the connecting member as a personal illuminator (see FIG. 10).

FIG. 12 shows an alternate form of the lamp body, referenced by 6. This lamp body 6 includes a plurality of light emitting diodes 60 disposed at the front side and the two opposite lateral sides. Similar to the lamp body shown in FIG. 2, the lamp body 6 also comprises two parallel rails 64 raised from the bottom side, an annular groove 62 disposed between the rails 64, and four retaining slots 63 equiangularly spaced through the annular groove 62. By means of the aforesaid connecting member 2, the lamp body 6 can be fastened to the frame tube 50 of the bicycle 5 (see FIGS. 13 and 14). Of course, the lamp body 6 can be separately used as a flash light.

We claim:

1. A lamp device comprising:

a lamp body having an arched lampshade at one end, said arched lampshade having two opposite extension portions, two toothed rails bilaterally disposed inside said lampshade to refract light, two parallel rails raised from a bottom side thereof, an annular groove disposed between the rails, and four retaining slots equiangularly spaced through said annular groove;

a circuit board installed inside said lamp body, said circuit board comprising a charge coupled device, a plurality of reversers, a battery, a spring switch, and at least one lamp bulb, said charge coupled device being disposed out of said lamp body to detect the intensity of outside light, said charge coupled device connecting said battery to said at least one lamp bulb when the intensity of out side light surpasses a predetermined value and when said spring switch is switched on, causing said at least one lamp bulb turned on to give light, said charge coupled device disconnecting said battery from said at least one lamp bulb when the intensity of outside light drops below said predetermined value;

a lamp mount comprised of a mounting frame for fastening to the bicycle frame of a bicycle, and a coupling frame for carrying said lamp body, said mounting frame comprising a circular frame body having two opposite ends terminating in two parallel lugs, a screw bolt, and a nut, the parallel lugs of said lamp mount having a respective through hole, said screw bolt being inserted through the through holes on the lugs of said mounting frame and screwed up with said nut to fix said mounting frame to the bicycle frame, said coupling frame comprising a flat plate at one end having a hook and a plurality of anti-skid stripes at a top side, a dovetail groove at an opposite end, a downward mounting ring disposed at a bottom side and mounted around said screw bolt and retained between the lugs of said mounting frame and having a tapered flange around the border fitted into the through hole of one lug of said mounting frame;

a connecting member connected between said lamp body and said lamp mount, said connecting member comprising a coupling disc at one end inserted in between the rails of said lamp body, and an elongated coupling plate at an opposite end inserted into said dovetail groove of said coupling frame, said coupling disc having a projecting block fitted into one retaining slot in said annular groove, said coupling plate having a hook at an inner side hooked up with the hook on said flat plate of said coupling frame; and wherein said projecting block of said coupling disc of said connecting member can be disconnected from said retaining slots and turned along said annular groove to adjust the angular position of said lamp body relative to said lamp mount, and then fitted into one retaining slot to fix said lamp body at the adjusted angular position.

2. The lamp device of claim 1 wherein said flat plate of said coupling frame of said lamp mount comprises a plurality of anti-skid stripes by which said flat plate can be pressed with the fingers to disconnect the hook of said coupling frame from the hook of said connecting member.

3. The lamp device of claim 1 wherein said lamp body comprises a plurality of light emitting diodes disposed on the outside and electrically connected to said circuit board.

* * * * *